No. 717,090.  
H. W. A. FETTE.  
FLEXIBLE SHAFT.  
(Application filed Aug. 7, 1902.)  
Patented Dec. 30, 1902.

(No Model.)

Witnesses:
Arthur Young
Edward Ray

Inventor:
Heinrich Wilhelm Adolf Fette
by his Attorneys
Roeder & Briesen

UNITED STATES PATENT OFFICE.

HEINRICH WILHELM ADOLF FETTE, OF ALTONA-OTTENSEN, GERMANY.

FLEXIBLE SHAFT.

SPECIFICATION forming part of Letters Patent No. 717,090, dated December 30, 1902.

Application filed August 7, 1902. Serial No. 118,734. (No model.)

*To all whom it may concern:*

Be it known that I, HEINRICH WILHELM ADOLF FETTE, a citizen of the German Empire, and a resident of Altona-Ottensen, Germany, have invented certain new and useful Improvements in or Relating to Flexible Shafts, of which the following is a specification.

The flexible shafts hitherto known consisting of separate members not only suffer from the disadvantage that their manufacture is comparatively expensive and accompanied by difficulties, but they have the drawback that the axes of the separate members, which are at right angles to one another, are more or less apart from one another, which causes a loose play in the surrounding sleeve or socket. The result of this play is not only a considerable wear of the members and their connections, but also the comparatively rapid wear of the surrounding sleeve or socket. Moreover, such shafts have only a very small degree of flexibility and a great consumption of power.

The object of this invention is to overcome these drawbacks—*i. e.*, to produce a flexible shaft the manufacture of which is not only considerably cheaper and simpler, but is subject to less wear, absorbs less power, and is therefore capable of transmitting a comparatively large amount of power.

The invention is illustrated in the accompanying drawings, in which—

Figure 1:
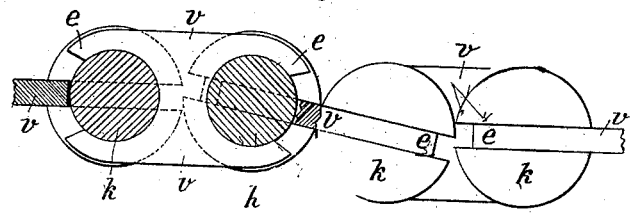
Figure 2:
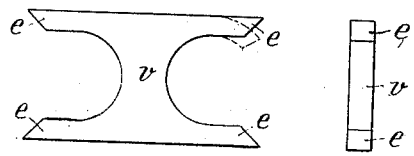
Figure 3:
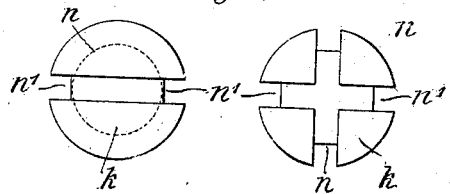

Figure 1 shows a portion of a flexible shaft, partly in section, according to this invention. Fig. 2 is a view in elevation and end view of the connecting member. Fig. 3 shows the ball-shaped member, and Fig. 4 shows a sectional elevation and end view of a modified form of connecting member.

The shaft comprises a series of ball-shaped bodies $k$, of suitable material, each provided with two circumferential grooves $n\ n'$, crossing one another preferably at right angles. (See Fig. 3.) Between a series of balls $k$ are arranged a series of flat connecting-links $v$, having a symmetric right-and-left concave edge or socket, so that each link is adapted to embrace two of the balls. Above and below each socket extends the prong $e$ of a two-armed fork, the prongs of each fork lying in a common plane and also in the same plane with the prongs at the opposite end of the link.

In assembling the parts the prongs are brought into engagement with the grooves of the balls and are then bent slightly inward to interlock the parts, adjoining links being arranged at right angles to each other. In this way a flexible shaft is formed the different members of which are connected by flexible joints in such a manner that any axial displacement at the joints is prevented, and power may thus be readily transmitted.

Figure 4:
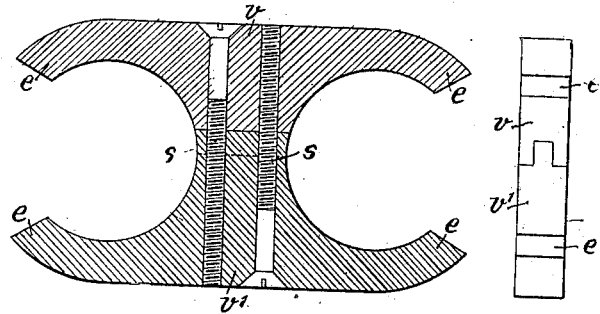

In constructions on a large scale the connecting-plates may be made in two parts $v\ v'$, which fit together by means of a groove and projection or feather, and are secured together by screws or bolts $s$, Fig. 4.

In consequence of the arrangement of the two axes of rotation crossing one another at an angle and of the short distance between the links of the separate members resulting from this arrangement a greater degree of mobility, and therefore of flexibility, is obtained for the new shaft as compared with those hitherto manufactured.

What I claim is—

A flexible shaft composed of a series of balls having intersecting grooves, and of a series of intermediate flat links having a pair of symmetric concave bifurcated ends, each end being adapted to embrace one of the balls, substantially as specified.

Signed by me at Hamburg, Germany, this 28th day of July, 1902.

HEINRICH WILHELM ADOLF FETTE.

Witnesses:
F. TOTLU,
E. H. L. MUMMENHOFF.